United States Patent [19]

Van Geenen

[11] Patent Number: 4,644,051

[45] Date of Patent: Feb. 17, 1987

[54] CATALYTIC REACTION OF POLYOL WITH BIS-ACYL LACTAM

[75] Inventor: Albert A. Van Geenen, Brunssum, Netherlands

[73] Assignee: Stamicarbon B.V., Geleen, Netherlands

[21] Appl. No.: 686,411

[22] Filed: Dec. 26, 1984

[30] Foreign Application Priority Data

Jan. 3, 1984 [NL] Netherlands .................... 8400006

[51] Int. Cl.$^4$ ............................................. C08G 69/20
[52] U.S. Cl. .................... 528/323; 525/411; 525/432; 525/437; 525/452; 525/474; 528/26; 528/27; 528/73; 528/288; 528/289; 528/292; 528/312; 528/317; 528/318; 528/320; 540/487; 540/525; 540/526; 540/529
[58] Field of Search ................ 528/323, 312, 26, 288, 528/317, 320, 27, 289, 318, 73, 292; 525/411, 452, 474, 437; 260/239.3 R, 239.3 B

[56] References Cited

U.S. PATENT DOCUMENTS

| | | | |
|---|---|---|---|
| Re. 30,371 | 8/1980 | Hedrick et al. | 528/323 |
| 3,704,280 | 11/1972 | van der Loos et al. | 260/77.5 |
| 3,862,262 | 1/1975 | Hedrick et al. | 528/323 |
| 4,031,164 | 6/1977 | Hedrick et al. | 528/323 |
| 4,034,015 | 7/1977 | Hedrick et al. | 528/323 |
| 4,191,819 | 3/1980 | Meyer et al. | 528/315 |
| 4,507,465 | 3/1985 | Chiba et al. | 528/323 |
| 4,540,515 | 8/1984 | Van Geenen et al. | 260/239.3 R |
| 4,540,516 | 8/1984 | Van Geenen et al. | 260/239.3 R |
| 4,595,746 | 6/1986 | Gabbert et al. | 528/312 |
| 4,595,747 | 6/1986 | Gabbert et al. | 528/312 |
| 4,596,865 | 6/1986 | Gabbert et al. | 528/312 |

FOREIGN PATENT DOCUMENTS 1303509  1/1973  United Kingdom .

*Primary Examiner*—Harold D. Anderson
*Attorney, Agent, or Firm*—Cushman, Darby & Cushman

[57] ABSTRACT

The invention concerns a simple process for preparing an ester acyllactam and/or esteramide acyllactam by the catalytic condensation of imide and alcohol, characterized in that a polyol and an acyllactam compound are reacted in the liquid state in the presencce of a halide, carboxylate or acetylacetonate from beryllium, magnesium, calcium, strontium, barium, boron, aluminium, zinc or cadmium.

The invention is important for the preparation of compounds which may be used in the preparation of nylon block copolymers, more in particular in RIM-nylon systems (Reaction Injection Moulding), since when the compounds obtained according to the present invention are used in a RIM system, a very fast lactam polymerization takes place, and it therefore also relates to the preparation of nylon block copolymers.

16 Claims, No Drawings

CATALYTIC REACTION OF POLYOL WITH BIS-ACYL LACTAM

FIELD OF THE INVENTION

The invention relates to a process for the catalytic condensation of imides and alcohols to form ester acyllactam and estramide acyllactam compounds.

BACKGROUND OF THE INVENTION

In the anionic polymerization of lactams, such as caprolactam, ester acyllactam and ester amide acyllactam compounds are suitable promoters, or activators, for the polymerization. Especially in the reaction-injection-moulding (RIM) of nylon these compounds can be used, as they can provide short reaction times, which makes it possible to polymerize the lactam in the mould, without undue long polymerization times.

Reaction injection molding (RIM) is a one-shot injection molding technique wherein liquid components are introduced into a closed mold. Rapid polymerization of the liquid components occurs within the mold thereby resulting in formation of a molded plastic product. The liquid components are usually introduced into the closed mold by the impingement technique.

The pressures employed are much lower than in conventional injection molding processes.

In a RIM process, viscosity of the materials fed to a mold is about 50 cps to 10,000 cps, preferably about 1500 cps, at injection temperatures varying from room temperature for urethanes to about 150° C. for lactams. Mold temperatures in a RIM process typically range from about 100° C. to about 220° C. The mold pressures generally range from about 1 to 100 bar, more particularly 1-30 bar. At least one component in the RIM formulation consists of monomers and adducts thereof that are polymerized to a polymer in the mold.

RIM differs from injection molding in a number of important respects. The main distinction between injection molding and RIM resides in the fact that in RIM, a chemical reaction takes place in the mold wherein monomers or adducts are reacted so as to obtain a polymeric state. Injection molding is conducted at pressures of about 700 bar to 1400 bar in the mold cavity by melting a solid resin and conveying it into a mold maintained at room temperature and the molten resin at about 150° C. to 350° C. At an injection temperature of about 150° C. to 350° C. The viscosity of the molten resin in an injection molding process is generally in the range of 50,000 cps to 1,000,000 cps and typically about 200,000 cps. In an injection molding process, the resins solidify in about 10 to 90 seconds, depending on the size of the molded product, following which, the molded product is removed from the mold. There is no chemical reaction taking place in an injection molding process when the resin is introduced into a mold.

For practical purposes, in a RIM-process the chemical reaction must take place rapidly in less than about 2 minutes for smaller items.

In connection with nylons in general, the following developments of the anionic polymerization nylon are broadly germaine.

Polymerization of a lactam to give nylon has been known for many years.

U.S. Pat. No. 3,925,325 describes a catalyzed process for the preparation of monomeric and/or polymeric compounds such as esters, polyesters, ester amides, and polyester-polyamides which result from the reaction of an imide and an alcohol in the presence of an organoaluminium, imide-alcohol condensation catalyst.

U.S. Pat. No. 3,965,075 describes using an amide or a Group IVA, IB, IVB, VB, VIB, or VIII organometal compound for this condensation.

U.S. Pat. No. Re. 30,371 describes preparing polyester-polyamide compounds by condensation of an alcohol and acyllactams in the presence of at least one of a Group IA, IIA, IIB and IIIA metal or metal compound.

In U.S. Pat. No. 3,018,273 a process for the in situ polymerization of caprolactam is described, wherein an organomagnesium compound is used as an initiator, and an N,N diacyl compound is used as promoter (or activator).

The non-prepublished Netherlands Patent Applications Nos. 8,302,292 and 8,303,831 describe the preparation of N-substituted carbamoyllactam compounds while the non-prepublished Netherlands Patent Application No. 8,302,928 describes the use of such compounds in the preparation of nylon block copolymers.

British Pat. No. 1,067,153 describes a process for preparing nylon-block-copolymers by anionically polymerizing caprolactam in the presence of various activators suitable for preparing nylon 6 polymers. Preparation of nylon block copolymers using an isocyanate terminated polypropylene glycol and a potassium based catalyst is described. A nylon block copolymer containing at least one polyether block is thereby formed.

In U.S. Pat. Nos. 3,862,262, 4,031,164, 4,034,015 and 4,223,112 various aspects of the preparation of nylon blockcopolymers from caprolactam in the presence of an acyllactam activator are described.

U.S. Pat. Nos., 4,031,164 and 4,223,112 describe the lactam-polyol-polyacyl-lactam-block terpolymers having a specified ratio of the various components. More particularly, the former patent discloses the use of 18 to 90% by weight of polyol blocks in the terpolymer.

. U.S. Pat. No. 3,862,262 describes lactam-polyol-acyl-polylactam block-terpolymers.

U.S. Pat. No. 4,034,015 is directed to lactam-polyol-polyacyl-lactam or lactam-polyol-acyl-polylactam block terpolymers having at least about 5% ester end group termination.

In European Patent application No. 67693, now laid open to public inspection, acid halide materials and acyllactam functional materials are described as useful in the preparation of nylon block copolymers selected from the group consisting of those having the formula

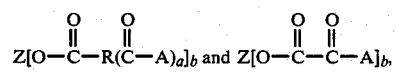

A is X or Q,
X is halogen,
Q is

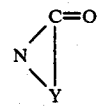

with
Y=$C_3$–$C_{11}$ alkylene;
a is an integer equal to 1, 2 or 3;
b is an integer equal to or greater than 2;

R is a di- or polyvalent group selected from hydrocarbon groups and hydrocarbon groups containing ether linkages; and Z is a segment of:
(1) a polyester having a minimum molecular weight of 2,000,
(2) a polyester containing polyester segments having minimum molecular weights of about 2000,
(3) a segment of a hydrocarbon or
(4) a polysiloxane.

European patent application No. 67,695, now laid open to public inspection, describes a process for preparing a nylon block copolymer by reactively contacting lactam monomer, basic lactam polymerization catalyst and the acyllactam functional material described in European patent application No. 67,693.

European patent application No. 67,694, now laid open for public inspection is directed to acid halide and acyllactam functional materials and to a process for the preparation of nylon block copolymers therewith. The acid halide or acyllactam functional materials are selected from the group defined by a complex formula.

Sibal et al, Designing Nylon 6 Polymerization Systems for RIM', apparently presented in part at the 2nd International Conference on Reactive Polymer Processing, Pittsburgh, Pa., in November 1982, described preparing various initiators for anionically polymerizing lactams including a polymeric initiator. This initiator is prepared by reacting hexamethylene diisocyanate (HDI) with a polypropylene oxide diol, having an average molecular weight of 2000, by slow addition of the polyol (1 mole) to two moles of HDI. The resulting product was reacted with anhydrous lactam at 80° C. No mechanical properties data are reported on the final product. Indeed, further work is said to be required to even begin exploring the processability and properties of the products. This paper also reports that reaction ratios and other process governing parameters are not known and further work is required.

U.S. Pat. No. 4,400,490 describes the anionic polymerization of a lactam with an epoxy-compound in the presence of a basic catalyst and a promoter. The epoxy compound can be the reaction product of a polymeric polyol and an epoxy compound.

U.S. Pat. No. 3,793,399 describes the use of a polyol, soluble in molten caprolactam, for improving the impact resistance of polycaprolactam. An organic nitrogen compound is used as a promoter in the polymerization.

The use of etherified polyols in the anionic polymerization of caprolactam is described in U.S. Pat. No. 3,770,689.

The object of the invention is to provide a simple process for the condensation of imide and alcohol.

DETAILED DESCRIPTION OF THE INVENTION

The process according to the invention is characterized in that a polyol and a acyllactam compound are reacted in the liquid state in the presence of a halide, carboxylate or acetylacetonate from beryllium, magnesium, calcium, strontium, barium, boron, aluminium, zinc or cadmium.

The reaction is carried out preferably in molten lactam, more specifically in molten caprolactam.

Surprisingly, research by Applicant has revealed that, in the presence of a Lewis acid, at low temperature, the reaction between a polyol and an acyllactam proceeds quickly. Moreover, there is virtually no polymerization of lactam, if there is any at all.

The term 'acyllactam' is understood to mean a compound having the following formula:

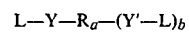

where
(L) is an unopened lactam ring, more specifically caprolactam,
Y and Y' each represent an acyl group, more specifically

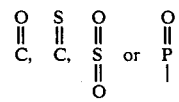

$R_a$ is an alkyl, aralkyl, alkylaryl or an aryl group, whether or not cyclic,
a is an integer $\geq 0$ and b an integer $\geq 1$.

In the process according to the invention the compounds having the following formula can be formed:

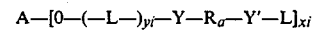

where:
A is a polyol residue from a polyol having the formula A—(OH)$_{xi}$ where
$xi$ is an integer $\geq 2$
$yi$ is an integer $\geq 0$
(—L—) is an opened lactam block and
(L), Y, R and a are as indicated above.

Depending on the reaction conditions, for each acyllactam group bound to the polyol a different value of $y_i$ may apply. This depends on whether in the reaction the lactam group is eliminated or opened. In the case of elimination, $y_i$ equals zero. In the case of opening, it will equal 1. However, in certain cases it may be advantageous that a relatively small polyamide block is formed between the polyol and the acyllactam.

As a polyol various organic hydroxy compounds, such as a polyfunctional hydroxy compounds having at least two hydroxyl groups per molecule can be used. Generally, the known polyols may be employed. Advantageously, the polyol is a polyetherpolyol, polyester-polyol, polybutadienepolyol, siloxane containing polyol and/or a socalled 'polymeric' polyol. The 'polymeric' polyols as defined herein include graft polymers obtained by grafting one or more ethylenically unsaturated monomers onto a polyether polyol as well as the polyurea dispersions in polyols (PUD). These polyurea dispersions can be obtained by dissolving a diamine or hydrazine together with a diisocyanate in stoichiometric amounts in a polyol and reacting the dissolved compounds to form a polyurea compound dispersed in the polyol.

The amount of the ethylenically unsaturated monomer grafted on the polyol ranges from 10–35% by weight on the final grafted product ('polymeric' polyol). Examples of suitable grafting monomers are especially acrylonitrile or a mixture of styrene and acrylonitrile. A suitable product of this type is known as Niax 31-28. Likewise, the amount of polyurea dispersed in the polyol is from 10–35% by weight of the total dispersion.

Advantageously these 'polymeric' polyols may be employed to yield a product (nylon block copolymer)

having a higher flexural modulus while, surprisingly, avoiding a decrease in impact resistance. Other examples of polyols that can advantageously be used are the poly(oxyethylene) and poly(oxypropylene) adducts or blends thereof of diols, triols and tetrols, polyols with polyether segments containing polyesters, polyester polyamine-polyols and polylactones. Polyols obtained by ethoxylating and/or propoxylating ethylene diamine, glucose, fructose, saccharose or trimethylolpropane an also suitable.

The polyols described hereinabove are mainly of a relatively high molecular weight. Advantageously, the equivalent weight of these polyols is at least 300, more particularly ranges between about 1000 and about 2500. In these ranges optimal properties of the final object are obtained, viz. a high impact-strength combined with a high flexural modulus without problems in preparing the activator, due to high viscosity.

It is to be understood that any molecular weight, or equivalent weight, referred to herein are numerical average weights. Furthermore, the term equivalent weight of a polyol is understood to mean the numerical average weight of the polyol per hydroxyl group, i.e. the molecular weight divided by the functionality.

The temperature at which the reaction is carried out is not very critical. It is an advantage to choose this temperature between 80° and 150° C., because the reaction can then be carried out without problems in molten caprolactam.

Examples of suitable acyllactam compounds are terephtaloylbiscaprolactam, adipoylbiscaprolactam, oxalybiscaprolactam, isophtaloylbiscaprolactam.

The reaction is carried out using a Lewis acid as catalyst. Suitable Lewis acids are metal salts such as halides, carboxylates or acetylacetonates from Beryllium, Magnesium, Calcium, Strontium, Barium, Boron, Aluminium, Zinc or Cadmium.

Examples of suitable catalysts are magnesium chloride, calcium fluoride, magnesium bromide, zinc acetate, cadmium acetate, barium chloride, barium bromide, beryllium chloride, strontium bromide, aluminum acetate, aluminum bromide and magnesium acetylacetonate. Preferably, magnesium chloride, zinc chloride, aluminum acetylacetonate, zinc acetylacetonate or mixtures thereof are used.

As indicated earlier, preference is given to the use of molten lactam, more specifically caprolactam, as reaction medium. It is also possible, however, to carry out the reaction in another solvent which is inert to the acyl compound, such as lactone. In addition, also a mixture of lactam with an inert solvent or a mixture of different lactams may be used.

The ratio of the reaction products depend on their functionality and on the desired properties of the end product. In general, per equivalent of hydroxyl groups in the polyol to be used, at least one equivalent of diacyllactam compound will be used, so that, in principle, every hydroxyl group can react with one diacyllactam molecule. In the case that a deficiency of diacyllactam is used, relative to the amount of hydroxyl groups, for example 3 diacyllactam molecules per 4 hydroxyl groups, a number of polyol molecules will combine, so that a higher-molecular polyolblock is obtained.

The invention is important for the preparation of compounds which may be used in the preparation of nylon block copolymers. More particularly, the present invention is important in the preparation of nylon block copolymers in RIM-nylon systems (Reaction Injection Moulding). Very fast lactam polymerization takes place when the compounds obtained according to the present invention are used in a RIM system. The present invention therefore also relates to the preparation of nylon block copolymers.

The invention is illustrated by means of a number of examples.

EXAMPLE I 5.0 g terephthaloylbiscaprolactam, 19,1 g polypropylene glycol (a diol with MW 2000, PPG 2000) and 16 g caprolactam were brought to 150° C. During stirring 0.1 g magnesiumchloride were added. Immediately after addition of the catalyst the viscosity of the reaction mixture was found to increase. Every half hour a sample was taken from the reaction mixture, which sample was analysed for the presence of unreacted polypropylene glycol and terephtaloylbiscaprolactam. After reaction during 6.5 hours the polypropylene glycol conversion was 100% and the terephtaloylbiscaprolactam conversion 90%. During further reaction this level remained constant.

EXAMPLES II UP TO AND INCLUDING V

In analogy to example I, with the amounts of terephtaloylbiscaprolactam and PPG 2000 mentioned there, the imide alcohol condensation was effected at 150° C., using different catalysts. The distributor used was caprolactam (16 g).

The Table, successively mentions the catalyst used, the amount of it and the terephtaloylbiscaprolactam conversion. In all cases a constant composition and a 100% conversion of the polypropyl glycol were reached after 4 hours' reaction.

TABLE

| Catalyst | amount g | terephtaloylbiscaprolactam conversion |
|---|---|---|
| I Magnesium chloride | 0.10 | 90% |
| II Aluminium triacetylacetonate | 0.34 | 95% |
| III Zinc diacetylacetonate | 0.28 | 95% |
| IV Zinc chloride | 0.13 | 95% |
| V Zinc acetate | 0.20 | 90% |

I claim:

1. A process for preparing an activator selected from the group consisting of an ester acyllactam, an esteramide acyllactam, or mixtures thereof by the catalytic condensation of an imide and an alcohol comprising:
    reacting a polyol and a bis-acyllactam compound in the liquid state in the presence of a Lewis acid catalyst, said Lewis acid catalyst being a halide, carboxylate or acetylacetonate of a metal compound wherein the metal component of said metal compound is selected from the group consisting of beryllium, magnesium, calcium, strontium, barium, boron, aluminum, zinc and cadmium.

2. Process according to claim 1 wherein when said Lewis acid is a carboxylate of any one of said metals, said carboxylate group is an acetate group.

3. Process according to claim 1 wherein said bis-acyllactam compound is selected from the group consisting of terephthaloylbiscaprolactam, adipoylbiscaprolactam, isophthaloylbiscaprolactam and oxalylbiscaprolactam.

4. Process according to claim 1 wherein said polyol is a polyether polyol, a polyester polyol or a polybutadiene polyol.

5. Process according to claim 4 wherein said polyol has a hydroxy functionality of 2 to 4.

6. Process according to claim 1 wherein the reaction is conducted in molten lactam.

7. Process according to claim 6 wherein said lactam is caprolactam.

8. A process for preparing compounds having the following formula:

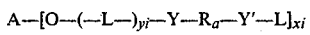

wherein said formula

A is a residue from a polyol having the formula A—(OH)$_{xi}$ $xi$ is an integer greater than or equal to 2

$yi$ is an integer greater than or equal to 0

(—L—) is an opened lactam block, (L) is an unopened lactam ring, $R_a$ is an alkylene, aralkylene, alkylarylene or an arylene group, a is an integer greater than or equal to 0 and Y and Y' independently represent an acyl group selected from the group consisting of C=O, C=S, O=S=O, or —P=O, in a process consisting essentially of:

reacting a polyol and a bis-acyllactam in the liquid state, wherein said reaction is conducted in molten lactam, said polyol having an equivalent weight of at least 300 and up to about 2500, said bis-acyllactam being selected from the group consisting of terephthaloylbiscaprolactam, adipoylbiscaprolactam, isophtaloylbiscaprolactam, and oxalylbiscaprolactam, said reaction being conducted in the presence of a Lewis acid selected from the group consisting of zinc chloride, zinc acetylacetonate, aluminum acetylacetonate, magnesium chloride, calcium fluoride, magnesium bromide, zinc acetate, cadmium acetate, barium chloride, barium bromide, beryllium chloride, strontium bromide, aluminum acetate, aluminum bromide, and magnesium acetylacetonate, said reaction being conducted at a temperature ranging from about 80° C. to about 150° C.

9. Process according to claim 8 wherein said polyol is a polyether polyol, a polyester polyol, a polybutadiene polyol, a siloxane containing polyol, a polymeric polyol or mixtures thereof.

10. Process according to claim 9 wherein said polyol is a polymeric polyol comprising a polyurea dispersion in a polyol, said polyurea dispersion obtained by dissolving a diamine or hydrazine together with a diisocyanate in stoichiometric amounts in a polyol and thereafter reacting the dissolved compounds to thereby obtain the polyurea compound dispersed in the polyol.

11. Process according to claim 9 wherein said polymeric polyol is a polyether polyol having at least one ethylenically unsaturated monomer grafted thereto, the amount of said ethylenically unsaturated monomer ranging from about 10 to 35% by weight of the final grafted polymeric polyol.

12. Process according to claim 8 wherein said polyol is an ethoxylated or propoxylated ethylene diamine, glucose, fructose, saccharose or trimethylolpropane.

13. Process according to claim 8 wherein an excess of the polyol, on an equivalents basis, to the bis-acyllactam compound is used.

14. Process according to claim 8 wherein the ratio of equivalents of the bis-acyllactam compound to the hydroxyl group from the polyol is substantially equal to 1.

15. Process according to claim 8 wherein said polyol has a hydroxy functionality of 2 to 4.

16. Process according to claim 8 wherein said molten lactam is caprolactam.

* * * * *